(12) United States Patent
Demir et al.

(10) Patent No.: US 9,846,746 B2
(45) Date of Patent: Dec. 19, 2017

(54) QUERYING GROUPS OF USERS BASED ON USER ATTRIBUTES FOR SOCIAL ANALYTICS

(71) Applicant: Facebook, Inc., Menlo Park, CA (US)

(72) Inventors: Deniz Demir, Sunnyvale, CA (US); Islam Farid Hamed AbdelRahman, Menlo Park, CA (US); Yingsheng Gao, Sunnyvale, CA (US); Liang He, Mountain View, CA (US); Ajoy Joseph Frank, Sunnyvale, CA (US); Wenrui Zhao, Fremont, CA (US); Maxim Sokolov, Palo Also, CA (US); Reid Steven Gershbein, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 459 days.

(21) Appl. No.: 14/548,703

(22) Filed: Nov. 20, 2014

(65) Prior Publication Data
US 2016/0147886 A1     May 26, 2016

(51) Int. Cl.
*G06F 17/30*     (2006.01)
(52) U.S. Cl.
CPC .. *G06F 17/30867* (2013.01); *G06F 17/30324* (2013.01)
(58) Field of Classification Search
CPC ............. G06F 17/30867; G06F 17/30324
See application file for complete search history.

(56) References Cited

U.S. PATENT DOCUMENTS

| | | | | |
|---|---|---|---|---|
| 5,761,652 A | * | 6/1998 | Wu | G06F 17/30333 |
| 2002/0095421 A1 | * | 7/2002 | Koskas | G06F 17/30595 |
| 2012/0143871 A1 | * | 6/2012 | Liebald | G06F 17/30702 |
| | | | | 707/738 |
| 2012/0209873 A1 | * | 8/2012 | He | G06F 17/30489 |
| | | | | 707/769 |
| 2014/0298423 A1 | * | 10/2014 | Moloian | H04L 63/10 |
| | | | | 726/4 |
| 2015/0213463 A1 | * | 7/2015 | Turner | G06Q 30/0201 |
| | | | | 705/7.33 |
| 2016/0026920 A1 | * | 1/2016 | Sullivan | G06N 5/04 |
| | | | | 706/11 |

* cited by examiner

*Primary Examiner* — Jay Morrison
(74) *Attorney, Agent, or Firm* — Fenwick & West LLP

(57) ABSTRACT

A system determines a set of users satisfying a given criteria based on attribute values of the users. The system associates each value of an attribute with a representation of users having that attribute value. The representation of users may be an enumeration of users or a bit index. The system receives a request for determining a set of users satisfying a given criterion. The system identifies a logical operation based on the criterion and performs the logical operation to determine the set of users. The representation of the set of users may be distributed across a plurality of processors, allowing the system to perform the logical operation in parallel. The system may further determine statistical information describing a characteristic of the set of users, for example, page likes by the set of users. The statistical information may be presented to a business for analyzing their target audience.

23 Claims, 8 Drawing Sheets

QUERYING GROUPS OF USERS BASED ON USER ATTRIBUTES FOR SOCIAL ANALYTICS

BACKGROUND

This invention relates to a query engine for social analytics to determine groups of users (audiences) from a given set of users based on user attributes and/or user connections for identifying characteristics of audiences.

Businesses often make or sell products targeted towards a subset of population (also referred to as the target audience of the business). Typically the target audience is a subset of population that satisfies certain demographic characteristics and/or includes audience forming an interest cluster or audience that likes certain pages hosted by an online system, for example, a social networking system. For example, a business may sell clothes targeted towards women of a particular age group. Another business may target men of certain age group living in a particular location that like certain page.

Businesses attempt to direct their sales and marketing efforts towards their target audience. For example, a business may create certain ambiance in a store that is expected to appeal to their target audience. Alternatively, the business may create a particular look and feel for a website that is expected to appeal to their target audience. However, businesses need to understand their target audience, for example, the likes/dislikes and characteristics of their target audience to be able to direct their marketing and sales efforts towards the right target audience.

Businesses often lack detailed insights into the characteristics of their target audience. For example, even if a business knows the age group and gender of the target audience, the business may not have accurate information describing the interests and likes/dislikes of their target audience.

Analyzing a target audience requires identification of a subset of a population. Identifying subsets of a population can be a resource intensive process if the size of the population is large, for example, hundreds of millions of users. Conventional techniques use sampling of users to perform analysis. However, the accuracy of these techniques depends on the size of the samples and the sampling strategy. As a result, businesses often lack proper insight into their target audience and fail to direct their resources towards the right set of people. Businesses may also lose significant revenue by targeting the wrong audience.

SUMMARY

Embodiments of the invention determine a set of users that satisfy a given criteria based on attribute values of the users and explicit actions of the users such as liking pages hosted by an online system or implicit actions of a user that associate the user with clusters such as interests clusters. A system stores attributes of users, each attribute associated with one or more values. The system stores indexes for representing attributes, for example, bit indexes or traditional indexes (i.e., inverted indexes) that store a list of users having each attribute value. In an embodiment, the system associates each value of an attribute with a bit index. A bit index associated with an attribute value comprises bits, each bit representing a user and indicating whether the user has that attribute value. For example, an attribute "country" can have one of a plurality of values including "US," "UK," "Canada," and so on. The bit index for a particular value, say "US," may store 1 for all users that have country value equal to "US" and 0 for all users having a country value other than "US." Similarly, the bit index for "Canada" may store 1 for all users that have country value equal to "Canada" and 0 for all other users.

The system receives a query request for determining a set of users satisfying a given set of criteria. A criterion may specify values of a user attribute such as "age", or certain types of connections of the user, for example, page likes. The criterion may specify a single value, or multiple values, or a range of values. The criterion may further specify a logical operation such as "equal", "greater than", and the like. The system determines the set of users based on the result of the logical operation. The system retrieves bit indexes for the values specified in the criteria. If the index of the attribute is represented as a traditional index rather than a bit index, the index for that attribute value is first converted to a bit index after retrieval. The system determines the set of users satisfying the criterion based on the result of the logical operation on the retrieved bit indexes. If there is more than one criterion, the system determines the final set of users by combining the results of the criteria.

In an embodiment, a bit index is distributed across a plurality of processors. Each processor stores information describing a subset of users mapped to the processor. The processing of data in response to a query is performed in parallel by each of the plurality of processors using the portion of the bit index or traditional index allocated to that processor.

In an embodiment, the system determines statistical information describing a characteristic of the set of users determined and sends the information. For example, the system may determine an aggregate measure of affinity of the set of users for one or more pages.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
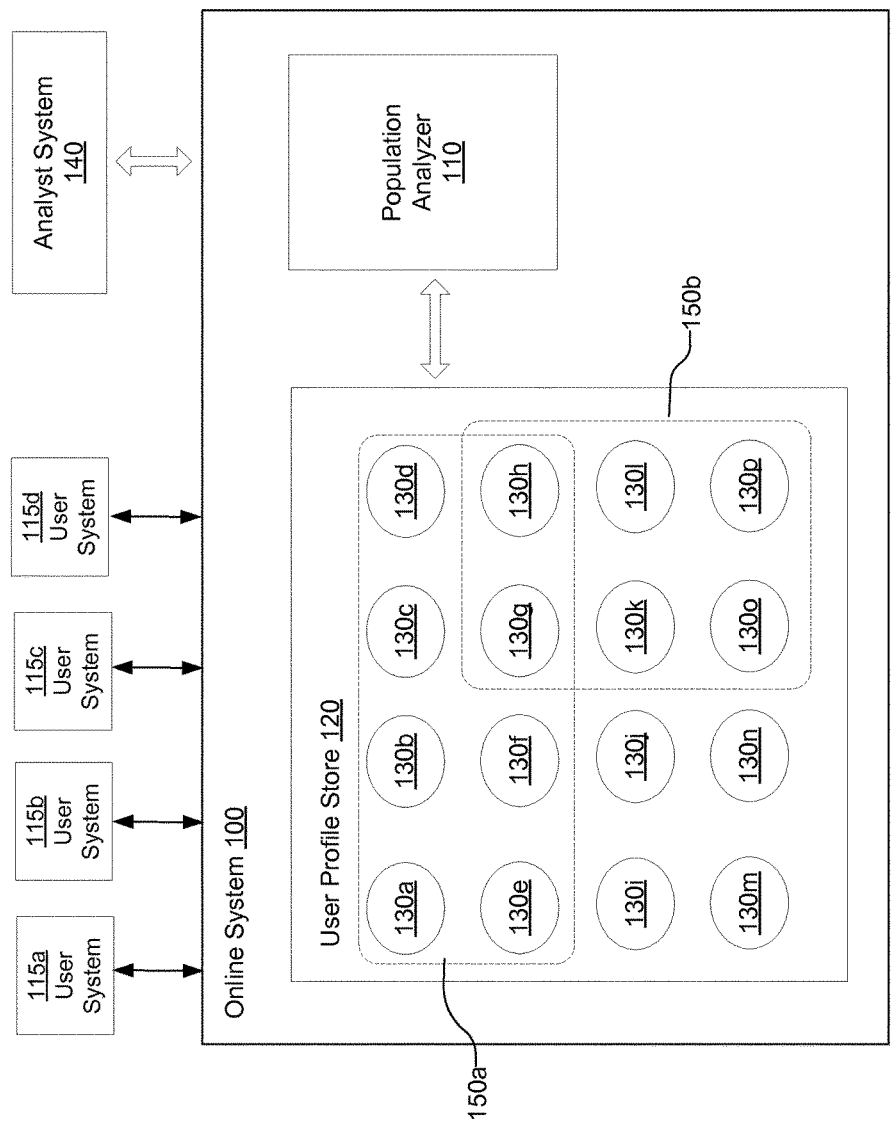
FIG. 1 is a diagram of the system environment for determining a group of users based on user attributes, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention query groups of users based on criteria based on user attributes and user connections. The user attributes specified in the criteria may be based on either user profile attributes or based on social information describing the users. Examples of user attributes based on user profile include, age, gender, country, state, financial status, education, and so on. Examples of user attributes based on social information include aggregate values based on connections of the user. Examples of user connections include other users, page likes, interests clusters, custom audiences, and so on.

The querying of groups of users may be used for social analytics. For example, marketers may use the querying to analyze groups of users having different characteristics. The ability to efficiently determine groups of users based on various characteristics of users including user profile attributes and social characteristics allows a marketer or any other user to quickly analyze characteristics of users, for example, using an interactive screen. Vendors can use embodiments of the invention to determine how best to target their sales strategies. The system disclosed can be used to determine a set of users having certain characteristics, for example, female gender within the age group of 20-25. Furthermore, characteristics of the selected group of users can be analyzed, for example, the types of pages liked by the users belonging to the group. This information may be used by vendors to determine how best to present their products/services to users, for example, the types of advertisements to present, the type of ambience to use in their stores, and so on.

Embodiments use a distributed architecture to determine the groups of users efficiently. The processes described herein are amendable to parallel/distributed processing. Accordingly, embodiments allow large data sets, for example, terabytes of data representing user profiles of hundreds of millions of users to be processed in real time for use in an interactive user interface. Embodiments organize data in-memory and on secondary storage, for example, flash disks to allow fast querying of large amount of data on a distributed set of machines.

In an embodiment, the system uses a hybrid indexing system, which indexes dense attributes as bitmaps and sparse attributes as traditional indexes (i.e., inverted indexes). The system determines the type of index used for an attribute based on the number of keys (unique values) that the attribute can take. The system uses a bit index for attributes that have fewer than a threshold number of keys and a traditional index for attributes that have large number of keys. For example, age attribute has approximately hundred keys and accordingly, the system uses a bit index to represent age attribute. On the other hand, a city attribute can have almost million keys and the system uses a traditional index to represent the city attribute. Traditional indexes are converted to bitmaps for responding to a query.

In an embodiment, all attribute values are represented as integers. For example, for "country" attribute, value "US" is represented as an integer value, say 1. Another country, say "UK," may be 2, and so on. The mapping between values and what each value represents may be received from a user or from an external system.

In an embodiment, the system represents an attribute using a cumulative bit index. Accordingly, bits for a value represent users who have that particular value of the attribute as well as all users who have that particular value and lower values for that attribute. For example, bit for an age attribute with value 20 has 1 for all users that have age 20 or less than 20.

The ability to determine groups of users can be used by a business to define a subset of a population as its target audience. Furthermore, embodiments determine statistical information describing characteristics of the set of users. The information describing characteristics of the set of users can be used by a business to study their target audience, for example, to identify their interests, likes, and dislikes. The information describing interests of the target audience may comprise web pages liked by the target audience.

Embodiments determine information comparing the characteristics of the group of users with other groups of users. For example, the characteristics of a subset of population may be compared with the characteristics of the entire population being analyzed. A business can use the information describing the target audience to determine how to adapt its marketing and sales strategies to the target audience. For example, the business may use likes and dislikes of the target audience to define advertisement creatives that appeal to the target audience, to define the look and feel of their website, or to define their in-store experience for customers.

System Environment

FIG. 1 is a diagram of the system environment for determining a group of users based on user attributes, in accordance with an embodiment of the invention. The system environment shown in FIG. 1 includes an online system 100 that represents users. FIG. 1 shows various entities, for example, user systems 115 for allowing users to interact with the online system 100 and analyst systems 140 for allowing business analysts to interact with the online system 100 to study characteristics of sets of users of the online system.

FIG. 1 and the other figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral (e.g. "130" in the text refers to reference numerals "130*a*" and/or "130*b*" in the figures).

The online system 100 includes a user profile store 120 and a population analyzer 110. The user profile store 120 stores user profiles 130 of the users 115 that interact with the online system 100. The user profile store 120 may include user profile information imported from other systems, for example, from an external system (not shown in FIG. 1.) The information imported from other systems may describe users are not users of the online system 100. In this embodiment, the online system 100 acts as a tool for allowing business analysts to analyze user information obtained from various sources.

The user systems 115 interact with the online system 100 to utilize features provided by the online system 100. For example, the online system 100 may allow the users to communicate with each other via emails or online chat. The online system 100 may allow users to make purchases of certain products or services. The online system 100 may provide content to the users. The online system may present web pages to users. In an embodiment, users can interact with the web pages. User interactions include commenting on a web page, recommending a web page to other users, liking or disliking a web page, and so on.

In an embodiment, the online system 100 is a social networking system that allows users to establish connections with other users. Connections of a user include connections of users with entities represented in the system, for example, pages, users, social groups, and so on. The connections are formed by either the explicit actions of the users to form connections such as liking pages. Connections of users may be formed using third party data. Connections of users may also be formed based on actions of the users or information about users that results in the user being placed in a cluster such as interests clusters.

A user that has connections with one or more other users of the social networking system may interact with the other users via the social networking system. The user may also receive information describing activities of the other users connected to the user, for example, as newsfeed provided by the social networking system. A user can interact with various entities represented in the social networking system, for example, events, social groups, images, web pages, and so on. Interactions of a user with an entity include liking/disliking an entity, commenting on an entity, retrieving information associated with the entity, and so on.

The population analyzer 110 receives specification of a subset of population from a user, for example, the business expert 140. In an embodiment, the specification identifies one or more attributes of user profiles and corresponding values. The population analyzer 110 determines a subset 150 of users with information stored in the user profile store 120. The subset of users may be determined based on one or more demographic attributes. The population analyzer further determines characteristics of the subset of population, for example, information indicating likes and dislikes of the users from the subset.

In an embodiment, the online system 100 presents a user interface to the analyst system 140 to interact with the population analyzer 110. For example, the user interface may allow a business expert using the analyst system 140 to specify attributes for selecting a target audience and also to display statistical information describing certain characteristics of the target audience.

Figure 2:
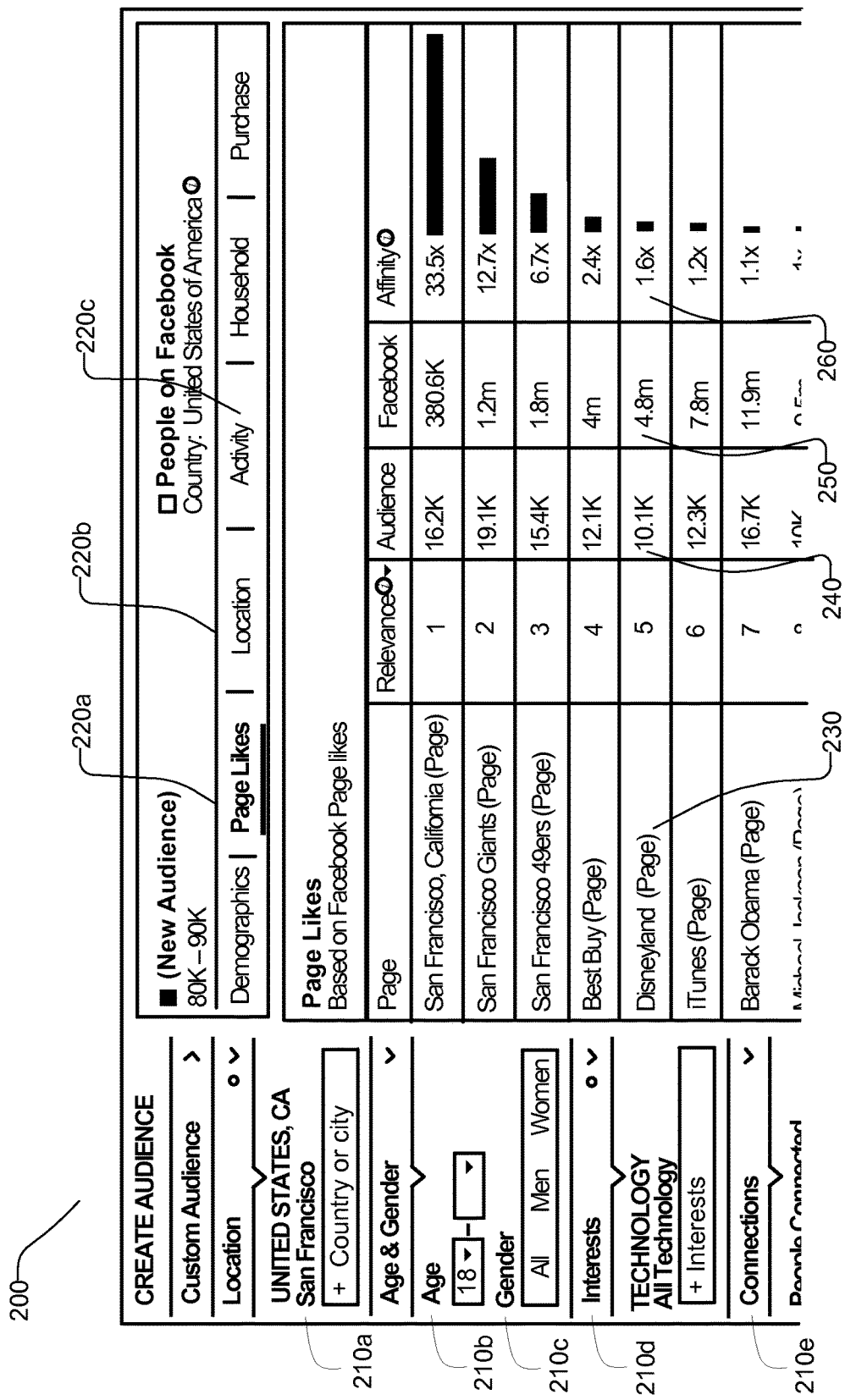
FIG. 2 shows a screenshot of a user interface for specifying a query for determining a group of users based on user attributes, according to an embodiment.

FIG. 2 shows a screenshot of a user interface for specifying a query to determine a group of users based on user attributes, according to an embodiment. The user interface 200 may be part of a population analysis user interface illustrated in FIG. 3 and described below. The user interface 200 allows a user to input criteria for determining the subset of users based on various user attributes 210. The user attributes 210 may be demographic attributes including location 210a, age 210b, gender, 210c, interests 210d, and so on.

The user interface 200 also allows the user to specify criteria based on social information, for example, information describing connections of users. The information describing connections of users that can be specified in a query may include number of connections of user, number of connections having more than a threshold measure of affinity, demographic attributes of the connections, and so on.

In an embodiment, the user interface 200 allows a user to specify criteria based on an aggregate value based on attributes of connections of a user. For example, a user may request all users of a social networking system that have more than a threshold number of connections or more than a threshold number of connections having a measure of affinity above a given value. Similarly, a user may request a set of users with more than a threshold number of connections satisfying certain criteria, for example, more than a threshold number of connections having a particular gender, a particular ethnic background, a particular language, a particular age group, or similar criteria. Alternatively, the user may request a group of users having connections that have more than a threshold age value, more than a threshold average income, more than a threshold level of education, and so on.

The user interface 200 allows users to specify the type of information describing characteristics of the selected group of users that is requested. For example, the user interface 200 allows a user to request information describing page likes 220a of the selected set of users, location 220b of the selected set of users, certain activity 220c performed by the selected set of users, and so on. FIG. 2 shows information describing page likes 220a of the selected set of users. FIG. 2 shows the top ranking pages liked by the selected set of user ranked by an aggregate measure of affinity of the users for each page.

The user interface 200 may present statistical information describing the selected set of user along with corresponding information from another set of users. The other set of users may be a larger set that subsumes the selected set of users, for example, the entire set of users of the online system 100. Alternatively the other set may be a set distinct from the set of users. For each page displayed, the user interface displays information identifying the page 230, number of users 240 of the selected set of users that liked the page, number of users 250 of the online system 100 that liked the page, and an aggregate measure of affinity 260 of the users of the selected set for the page.

System Architecture

Figure 3:
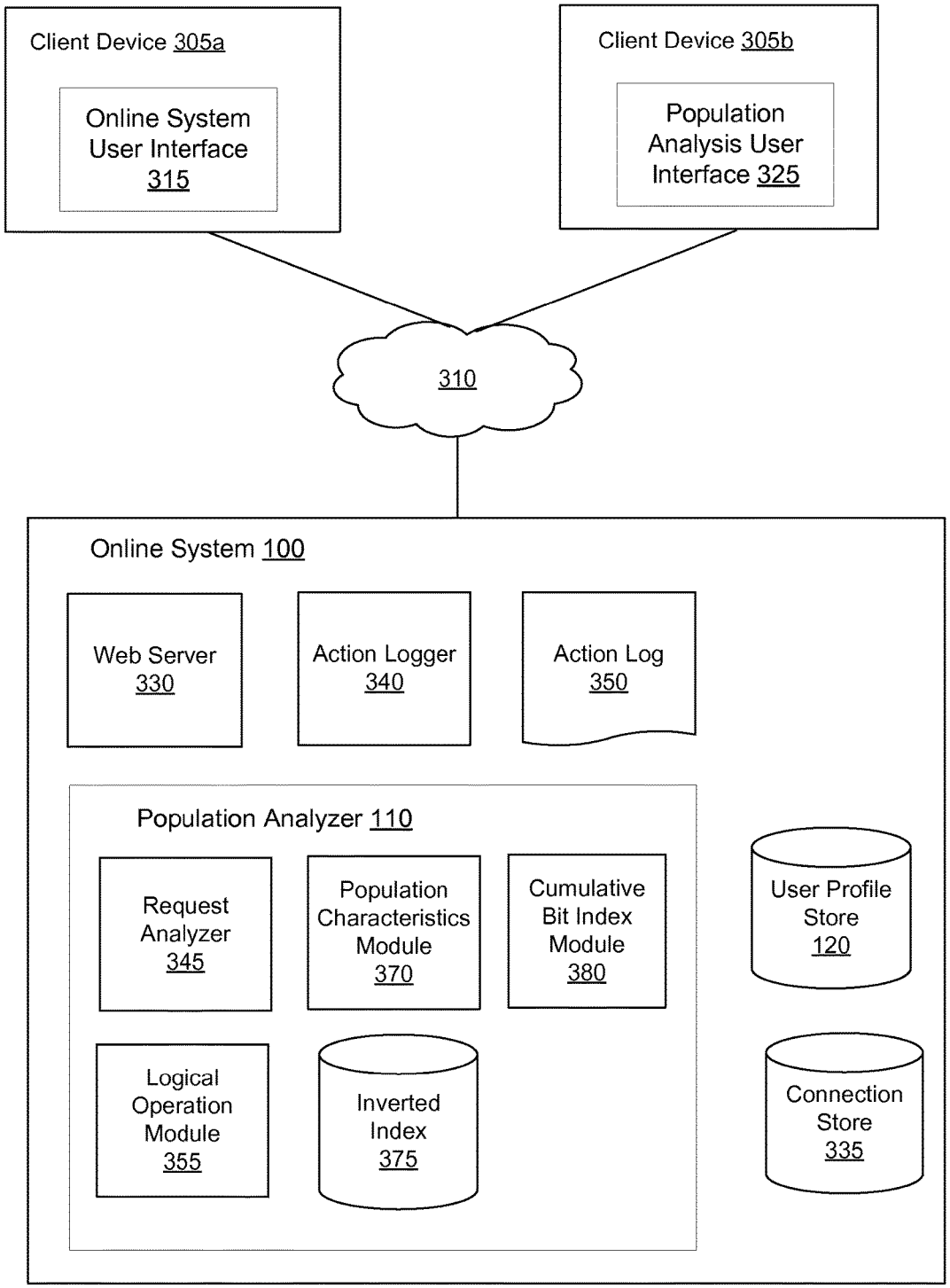
FIG. 3 is a high level block diagram illustrating the architecture of a system for determining groups of users based on user attributes, according to an embodiment.

FIG. 3 is a high level block diagram illustrating the architecture of a system for determining groups of users based on user attributes, according to an embodiment. The system comprises one or more client devices 305, an online system 100, and a network 310. In alternative configurations, different and/or additional modules can be included in the system. Functions described as being performed by a particular system or module may be performed by other systems or modules.

The client devices 305 comprise one or more computing devices that can receive user input and can transmit and receive data via the network 310. In one embodiment, the client device 305 is a conventional computer system executing, for example, a Microsoft Windows-compatible operating system (OS), Apple OS X, and/or a Linux distribution. In another embodiment, the client device 305 can be a device having computer functionality, such as a personal digital assistant (PDA), mobile telephone, video game system, etc.

The client device 305 can execute an application, for example, an internet browser application 315 that allows a user of the client device 305 to interact with the online system 100. The interactions may correspond to various actions performed by users including retrieving information, sending messages, receiving impressions of advertisements, clicking on advertisements, performing transactions, performing searches, and so on. The online system 100 may use the user actions to determine characteristics of various users or sets of users. For example, the online system 100 may store information describing which pages are liked by users to determine whether a set of users having particular demographic characteristics likes a particular page compared to users having different demographic characteristics.

Some client devices 305b may be used by the online system 100 to present the population analysis user interface 325. The online system 100 receives requests for analyzing various groups of users from the population analysis user interface 325 executing on the client device 305b. The online system 100 may receive a request to determine a group of users based on a set of user attributes. For example, the online system 100 may receive from the population analysis user interface 325, a request to determine all users having male gender and age in the range of 20-30.

The online system 100 receives from the population analysis user interface 325, requests to determine certain characteristics of a group of user. For example, the online system 100 may receive from the population analysis user interface 325, a request to determine an aggregate measure of a rate at which users of a group interact with a page or like a page. The online system 100 receives from the population analysis user interface 325, requests to compare characteristics of a group of user with another group of users. For example, the online system 100 may receive from the population analysis user interface 325, a request to compare an aggregate measure of affinity of the users towards a page with the aggregate measure of affinity of all the users of the online system 100 for the same page.

The network 310 allows the client devices 305 to interact with the online system 100. In one embodiment, the network 310 uses standard communications technologies and/or protocols. Thus, the network 310 can include links using technologies such as Ethernet, 802.11, worldwide interoperability for microwave access (WiMAX), 3G, digital subscriber line (DSL), etc. The data exchanged over the network 310 can be represented using technologies and/or formats including the hypertext markup language (HTML), the extensible markup language (XML), etc.

The online system 100 includes a web server 330, an action logger 340, an action log 350, a user profile store 120, a connection store 335, and the population analyzer 110. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system. Although FIG. 1 shows various modules as included within the online system 100, other embodiments may distribute the modules across multiple systems. For example, the population analyzer 110 may be included in a system separate from the online system 100 (not shown in FIG. 1) that interacts with the online system 100 using the network 310.

The web server 330 links the online system 100 via the network 310 to one or more client devices 305. The web server 330 serves web pages, as well as other web-related content, such as Java, Flash, XML, and so forth. For example, the web server 330 may provide the functionality of receiving and routing messages between the online system 100 and the client devices 305, for example, instant messages, queued messages (e.g., email), text and SMS (short message service) messages, or messages sent using any other suitable messaging technique. In an embodiment, the web server 330 configures for presentation user interfaces displayed via the online system user interface 315 or via the population analysis user interface 325. For example, the web server 330 may present The action logger 340 receives communications from the web server 330 about user actions on and/or off the online system 100. The action logger 340 populates the action log 350 with information about user actions to track them. Such actions include retrieving information, sending messages, receiving impressions of advertisements, clicking on advertisements, performing transactions, performing searches, and so on. The online system uses the data available in the action log 350 to generate different types of statistical information describing activities of the users that can be used to determine characteristic of the users.

The user profile store 120 stores information identifying various users of the online system 100. In an embodiment, the online system 100 requires users to register with the online system 100 and provide information for identifying the user, for example, first and last name as well as demographic information, for example, age, education, location, and so on. Actions of the various users stored in the action log 350 may be associated with a user account of the user that performed the action.

In an embodiment, the online system 100 is a social networking system and includes a connection store 335. The connection store 335 stores data describing the connections between different users of the social networking system. The connection store 335 may store relations between a user and various types of entities represented in the social networking system, for example, other users, pages describing an entity, social group, organization, and so on. The connections may be defined by users, allowing users to specify their relationships with various entities represented in the social networking system, for example, users, social groups, and the like. A user may create a connection with another user by sending a request to the other user to establish a connection with the other user. If the other user accepts the request of the first user the social networking system stores information indicating the connection in the connection store 335.

The connection store 335 may store connections between a user and a page represented in the social networking system. For example, the social networking system may create a connection between a user and a page if the user likes the page. In an embodiment, the social networking system may store a connection between a user and a cluster (or group) of users. The cluster of users may be an interests cluster determined by the social networking system by grouping users having similar interests. For example, users showing interests in a particular type of sports activity may be clustered together. Accordingly, the connection store 335 stores connections between users that specify that particular sports activity as their interest and that cluster of users.

In an embodiment, the social networking system creates a custom cluster of users by identifying a set of users belonging to the cluster. For example, the social networking system may receive a list of users belonging to a cluster from a third party. The third party pay provide information identifying the set users by listing their phone numbers, emails, or any information uniquely identifying each user. The social networking system matches the information identifying users with user profile attributes of users stored in the social networking system to match the receives information with user accounts of the social networking system. The social networking system determines the custom cluster based on the matching user accounts of the social networking system. In some embodiments, user clusters are generated based on information received from third party data partners. The social networking system represents various connections of a user using indexes, for example, bit indexes or traditional indexes.

The connection between users may be a direct connection; however, some embodiments of a social networking system allow the connection to be indirect via one or more levels of connections. Connections may also be established between different types of entities for example, the social networking system can have an object representing a school and users of the social networking system that study in the school or who are alumni of the school can connect with the school in the social networking system.

Requests received by the online system 100 from the population analysis user interface 325 are forwarded by the online system to the population analyzer 110 to determine the appropriate subset of users to be analyzed and to perform the requested analysis. The population analyzer 110 comprises an inverted index store 375, a request analyzer 345, a logical operation module 355, a cumulative bit index module 380, and a population characteristics module 370.

The inverted index store 375 stores inverted indexes that represent associations between values of attributes of users and sets of users having those values. An inverted index maps each value of an attribute to a representation of a set of users having that value for that particular attribute.

As an example, consider the user profile attributes gender and age. Assume that the online system allows the gender attribute to be assigned two possible values, "male" and "female." Accordingly, the inverted index store 375 stores a mapping from these two values of the gender attribute to sets of users. The "male" value of the gender attribute is mapped to all users that have the gender attribute specified as "male" and the "female" value of the gender attribute is mapped to all users that have the gender attribute specified as "female."

The age attribute can take various integer values, for example, integers between 14 and 100. For each integer value of the age attribute, the inverted index store 375 stores a mapping from the value to a set of users for which the age attribute has that value. For example, the value "14" is mapped to all users having age assigned to 14, the value "15" is mapped to all users having age assigned to 15, and so on. Similarly, if the user profile has a country attribute indicating the country of a user, the inverted index store 375 stores a mapping from name of each country that can be assigned to the country attribute to the set of users from that country (based on the country attribute value of the users).

In an embodiment, a set of users for an attribute value is represented an enumeration of all the users belonging to the set. This representation may be based on a data structure for storing arbitrary number of elements, for example, a linked list or a tree structure. In another embodiment, the set of users having an attribute value is represented a bit index. The bit index comprises a plurality of bit values, each bit value associated with a user. The bit index represents all the users represented in the system. For example, if the system represents N users, each bit index stores N bit values.

Assume that a bit can take two possible values, a first value and a second value. The bit corresponding to a user is assigned the first value if the attribute of the user matches the attribute value associated with the bit index. Alternatively, the bit corresponding to a user is assigned the second value if the attribute of the user has a value different from the attribute value associated with the bit index. For example, a bit value 1 may be used for a user for whom the attribute has the value associated with the bit index and the bit value 0 may be used for a user for whom the attribute has a value different compared to the value associated with the bit index.

Consider an attribute having values X, Y, and Z. And assume that the system has N users. Each value X, Y, and Z is associated with a bit index of size N. The $i^{th}$ bit value of the bit index corresponds to the $i^{th}$ user in the system based on a predetermined ordering of the users. The bit index for value X stores N bit values, say bitx[1 . . . N]. The bitx[i] value is 1 if the $i^{th}$ user has the attribute value X. The bitx[i] value is 0 if the $i^{th}$ user has the attribute value different from X, i.e., the attribute value is either Y or Z. Similarly, the bit index for value Y stores N bit values, say bity[1 . . . N]. The bity[i] value is 1 if the $i^{th}$ user has the attribute value Y. The bity [i] value is 0 if the $i^{th}$ user has the attribute value different from Y, i.e., the attribute value is either X or Z. Similarly, the bit index for value Z stores N bit values, say bitz[1 . . . N]. The bitz[i] value is 1 if the $i^{th}$ user has the attribute value Z. The bitz [i] value is 0 if the $i^{th}$ user has the attribute value different from Z, i.e., the attribute value is either X or Y.

The cumulative bit index module 380 determines a cumulative bit index based on inverted indexes mapping values of attributes to sets of users. The cumulative bit index is determined for an attribute for which the values are ordered as a sequence. A cumulative bit index for the attribute associates each attribute value X, with a set of users that have either the attribute value X or any value Y that occurs before the value X in the ordered sequence of values of the attribute.

The inverted index store 375 stores values of the identified attribute as a sequence. The sequence comprises a starting value followed by subsequent values. For example, for the age attribute the starting value may be 0. For an attribute representing the country of the user, the values may be arranged alphabetically and the country occurring first in the alphabetic order is identified as the starting value. The cumulative bit index module 380 determines a cumulative bit index value for the starting value as the bit index of the starting value as specified by the inverted index for the attribute. The cumulative bit index module 380 determines the cumulative bit index value for each subsequent value in the sequence by performing a bit-or operation on the bit-index of the subsequent value with the cumulative bit index of the previous value in the sequence.

For example, assume that an attribute takes values x1, x2, x3, and x4 that are ordered as a sequence in this particular order. The cumulative bit index corresponding to attribute x1 comprises the set of users identical to the set of users associated with x1 in the inverted index. The cumulative bit index value corresponding to attribute x2 is the set of users having the value x1 or x2. The cumulative bit index value corresponding to attribute x3 is the set of users having the value x1 or x2 or x3. And the cumulative bit index value corresponding to attribute x4 is the set of users having the value x1 or x2 or x3 or x4. The cumulative bit index is used for determining groups of users having at least one value of the attribute in a given range.

In an embodiment, the population analyzer module 110 stores the indexes in-memory and on embedded storage, for example, flash drives for fast access. The population analyzer module 110 indexes that are frequently accessed and stores such indexes in-memory. The population analyzer module 110 stores less frequently accessed indexes on the embedded storage. This allows the population analyzer module 110 to efficiently consume available resources.

The request analyzer 345 analyzes the requests received by the population analyzer 110 for determining groups of users and analyzing the groups of users. The request analyzer 345 parses the received request to build a representation of the information received in the request. The request is associated with a request type and may specify one or more attributes and values for the specified attributes. The request type determines how the specified attribute values should be related to the requested group of users. For example, a request may specify determining a group of users having an attribute value belonging to a specified set of values. Another request may specify determining a group of users having an attribute value belonging to a range of values. Similarly, a request may specify determining a group of users having a first attribute having a first value and a second attribute having a second value. The request analyzer 345 may also identify a type of characteristic that the population analyzer is requested to perform in a given request.

The logical operation module 355 performs logical operation based on the data in the inverted index store 375 to determine the requested group of users. The logical operation module 355 determines a type of logical operation to be performed based on the request type and identifies the inputs for the logical operation based on the attribute values specified in the request. The logical operation module 355 retrieves representations of the sets of users associated with the specified attribute values from the inverted index store 375. The logical operation module 355 performs the identified logical operation on the retrieved sets of users.

The process executed by the logical operation module 355 for performing a logical operation depends on the representation of the input sets of users retrieved from the inverted index store 375. For example, the logical operation module 355 may perform a logical-or operation for two sets of users represented as enumerations of users by adding together the elements of the input sets into one set. However, the logical operation module 355 may perform a logical-and operation on two sets of users represented as enumerations of users by iterating through one set and checking if each element of the set also belongs to the other set. The logical operation module 355 may build a hash table representation to determine if an element belongs to a set.

If the input sets of users are represented as bit indexes, the logical operation module 355 may perform a logical operation by iterating through the bit indexes to identify the $i^{th}$ element from each input bit index and performing the logical operation on the corresponding elements obtained from the bit indexes. The logical operation module 355 may perform the logical operation on two or more bit indexes in parallel for each corresponding bit values if the parallel resources are available. In an embodiment, the logical operation module 355 retrieves a set representation in one format and converts the set representation to another format for performing the logical operation. For example, the logical operation module 355 may retrieve a set representation enumerating the users of the set and build a bit index from the retrieved representation. Alternatively, the logical operation module 355 may retrieve a bit index representation of the set and build a set representation enumerating the users from the retrieved representation.

The population characteristics module 370 determines characteristics of a determined group of users. The population characteristics module 370 receives from the logical operation module 355, a representation of a group of users based on user attributes. The population characteristics module 370 also receives one or more types of characteristics to be analyzed for the determined group of users. The population characteristics module 370 analyzes the requested characteristic for the group of users and provides the result to the requestor, for example, for presentation via the population analysis user interface 325.

In an embodiment, the population characteristics module 370 determines an aggregate measure based on the requested characteristic. For example, a request may specify determining page likes by a given set of users. The population characteristics module 370 may determine the aggregate number of page likes by the determined set of users. The population characteristics module 370 may also determine an aggregate measure of affinity of the determined set of users for the page. In an embodiment, the population characteristics module 370 compares requested characteristics of a set of users with another set of users. For example, the population characteristics module 370 may compare a characteristic of a group of users against the entire set of users of the online system 100 or against a subset of the set of users of the online system 100.

Figure 4:
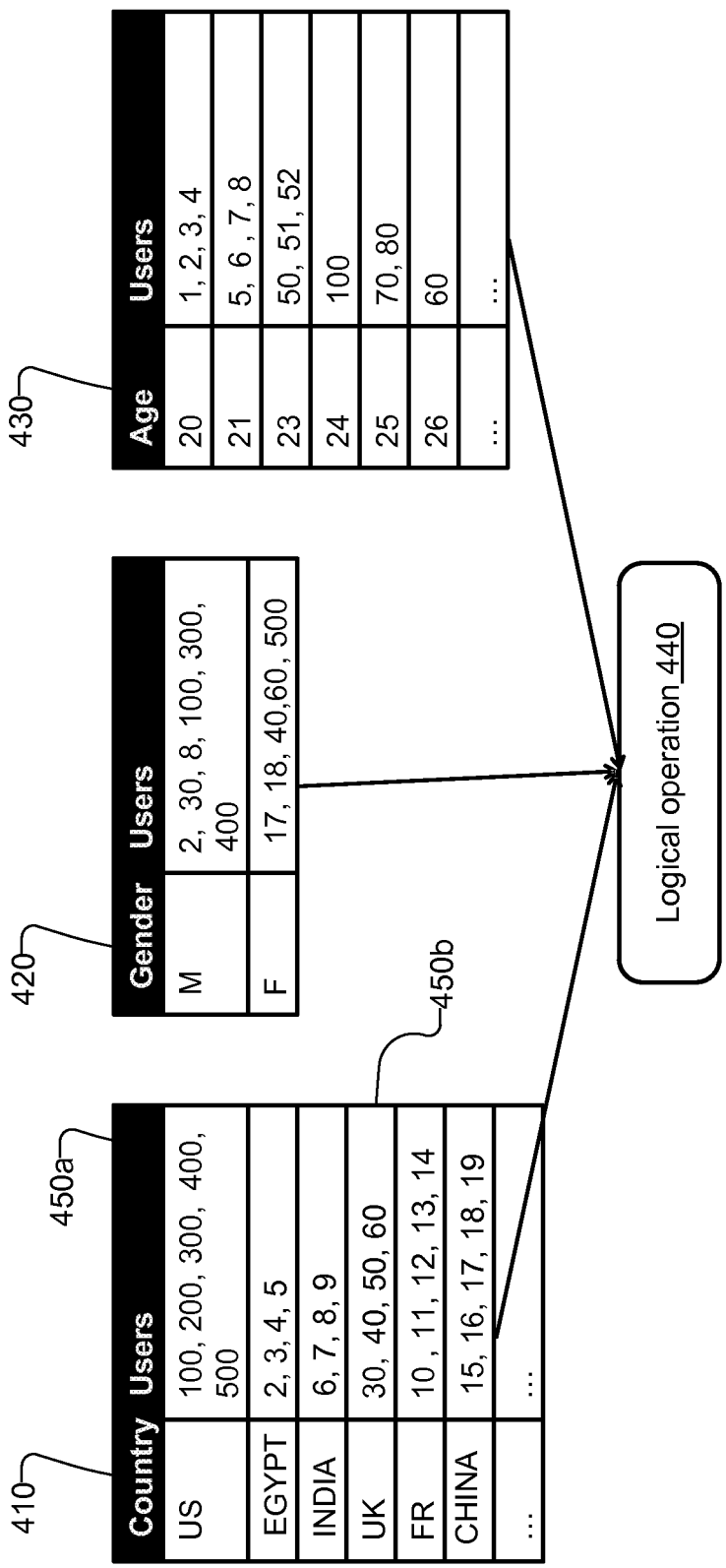
FIG. 4 illustrates a process for performing a logical operation based on inverted indexes storing sets of users as enumeration, according to an embodiment.

FIG. 4 illustrates how to perform a logical operation based on inverted indexes storing sets of users as enumeration, according to an embodiment. As shown in FIG. 4, an inverted index 410 is used to store attribute country, an inverted index 420 is used to store attribute gender, and inverted index 430 is used to store age. A request may be received to perform a logical operation 440 to determine a group of users based on one or more attributes of the users. Each set of users is represented as an enumeration of the users.

If the logical operation module 355 receives a request to determine a group of users having one of a plurality of values for the same attribute, the logical operation module 355 performs a logical-or operation by combining the enumerations of users of the corresponding sets. For example, if the logical operation module 355 receives a request to determine a group of users having the country as either US, UK, or Canada, the logical operation module 355 performs the logical-or operation of sets of users 450a and 450b.

However, if the logical operation module 355 receives a request to determine all users having a first value of a first attribute and a second value of a second attribute, the logical operation module 355 performs a logical-and operation. For example, if the logical operation module 355 receives a request to determine all users having the country as UK and gender as "male" and age 21, the logical operation module 355 performs a logical-and operation. Performing a logical-and operation using sets of users represented as enumeration of users can be inefficient for large number of users. Accordingly, the inverted index store 375 stores at least some of the attributes as bit indexes.

Figure 5:
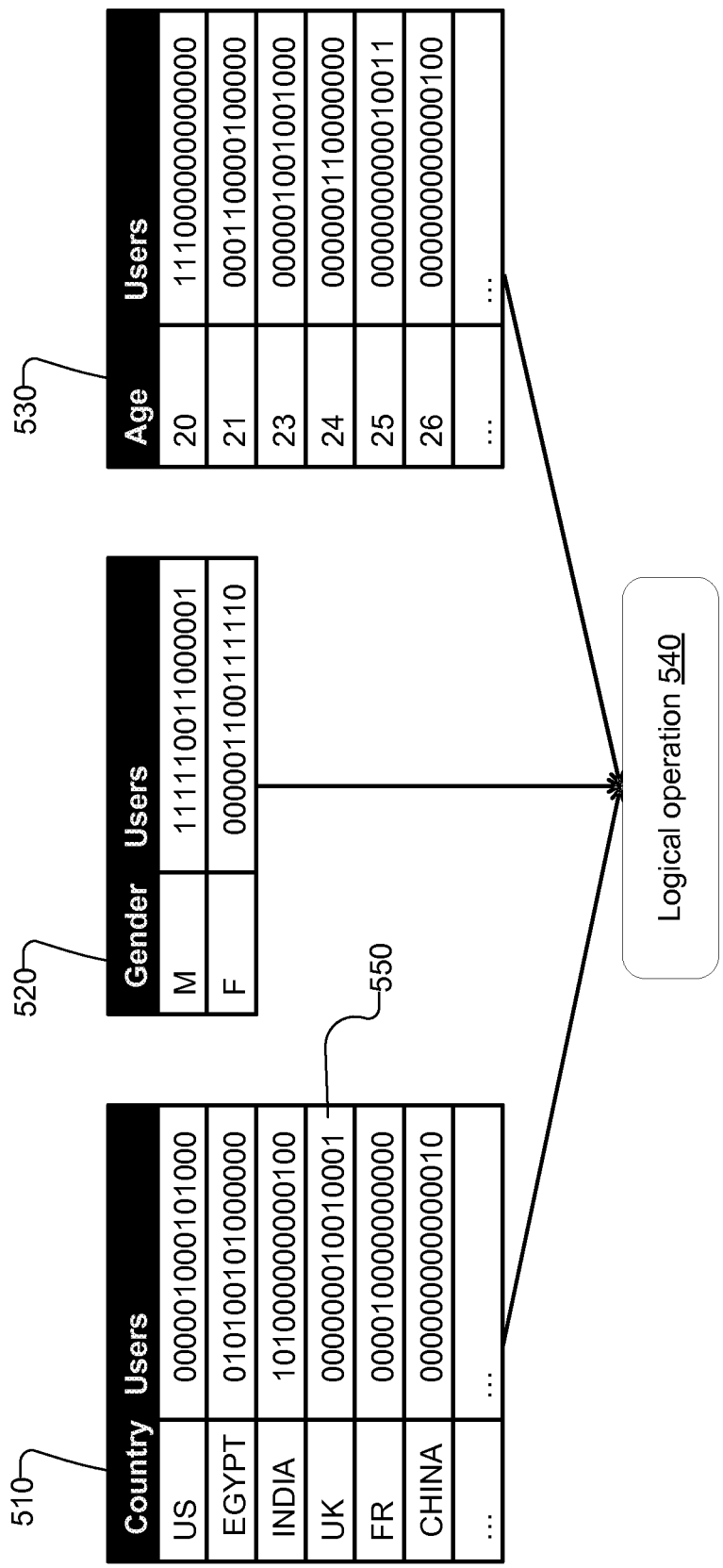
FIG. 5 illustrates a process for performing a logical operation based on inverted indexes storing sets of users as bit indexes, according to an embodiment.

FIG. 5 illustrates how to perform a logical operation based on inverted indexes storing sets of users as bit indexes, according to an embodiment. As shown in FIG. 5, the inverted indexes 510, 520, and 530 are represented as bit indexes. For example, bit index 750 comprises a bit array representing users having country UK. The $i^{th}$ bit value of the bit array represents the $i^{th}$ user. The bit value for the $i^{th}$ bit is 1 if the $i^{th}$ user has country attribute as UK or else the $i^{th}$ bit has value 0. Performing a logical-and operation using bit indexes is more efficient compared to performing the logical-and operation using enumerations of users for large sets.

Distributed Architecture

Figure 6:
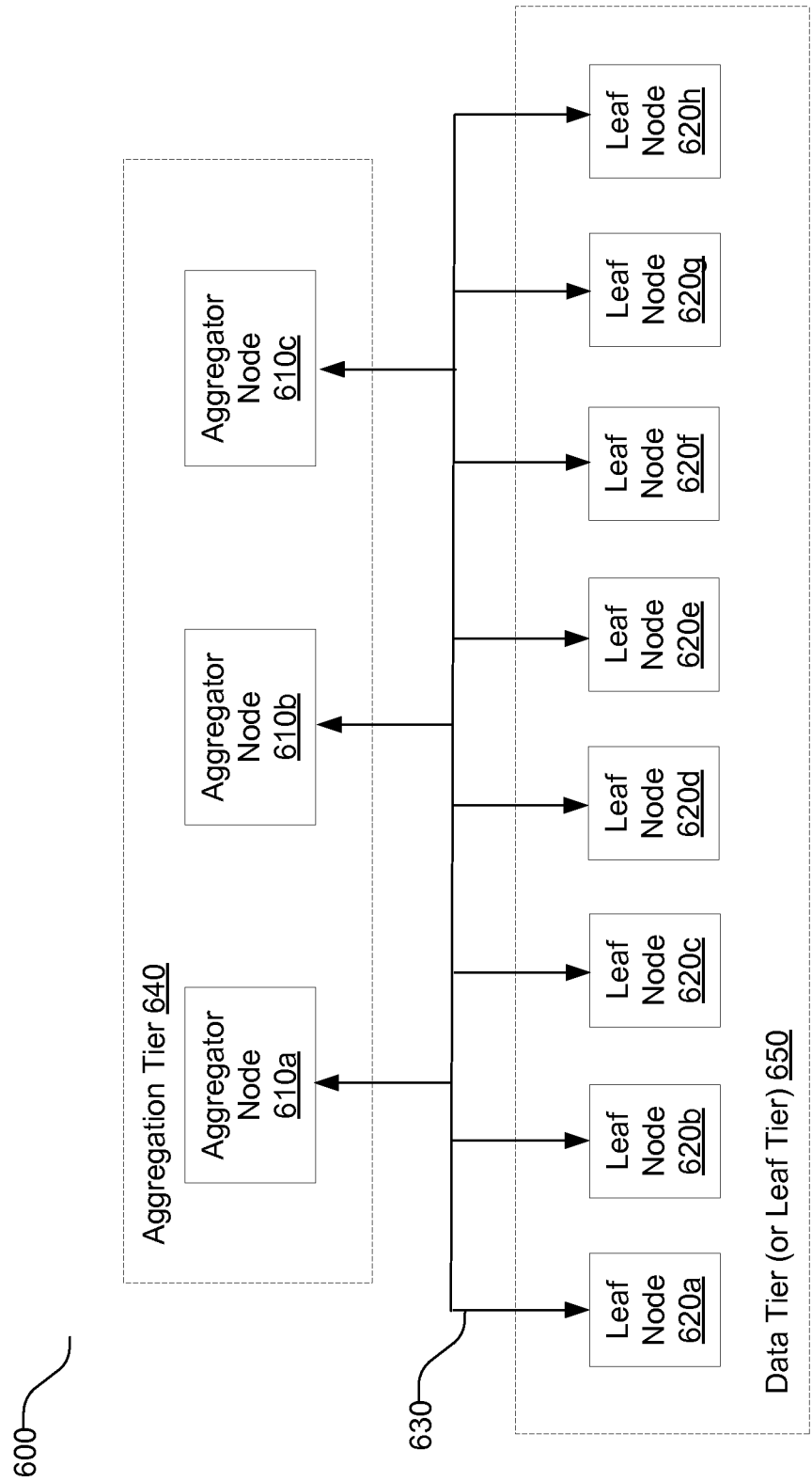
FIG. 6 shows a distributed architecture for determining groups of users based on user attributes, according to an embodiment.

In an embodiment, a distributed/parallel architecture performs the determination of groups of users and analysis of the groups of users. FIG. 4 shows a distributed architecture for determining groups of users based on user attributes, according to an embodiment. The distributed architecture 600 shown in FIG. 6 includes several computer processors that communicate with each other using a communication network 630. A node In an embodiment, processors in the distributed architecture 600 are divided into two groups, a data tier (or leaf tier) 650 and an aggregation tier 640. The processors in the data tier 650 are referred to as the leaf nodes 620 and the processors in the aggregator tier 640 are referred to as the aggregator nodes 610. User information is distributed across the data tier. For example, each leaf node 620 in the data tier 650 is allocated user attribute and connections information for a subset of users. In an embodiment, each leaf node 620 builds an inverted index storing user attribute information for users allocated to the leaf node 620 mapping user attribute values to representations of sets of users.

An aggregator node 610 sends a request for processing to a plurality of leaf nodes 620. Each leaf node 620 performs computation based on user profiles allocated to the leaf node 620 to determine an intermediate result set. The leaf node 620 returns the intermediate result set to the requesting aggregator node 610. The aggregator node 610 aggregates the intermediate results obtained from the leaf nodes.

In an embodiment, the aggregator tier 640 overlaps with the data tier 650. In other words, a processor can act as both a leaf node 620 and as an aggregator node 610. For example, once a leaf node 620 completes a processing of the subset of user profiles allocated to it, the leaf node 620 can receive intermediate results from other leaf nodes 620 and perform aggregation of the intermediate results.

In some embodiments, there can be multiple aggregator tiers 640 organized hierarchically, each aggregator tier 640 comprising aggregator nodes 610 that aggregate results obtained from aggregator nodes 610 of a lower aggregator tier 640. Accordingly, the data tier 650 may be considered an aggregator tier 640 at the lowest level in the hierarchy of aggregator tiers 640.

Each user is associated with an identifier (id) and user data is distributed among leaf nodes 620 based on user ids. In some embodiments, there may be certain metadata information that is provided to each leaf node 620. In an embodiment, a background process obtains data from a source, for example, a social networking system and uploads the data in the leaf nodes 620.

Overall Process

Figure 7:
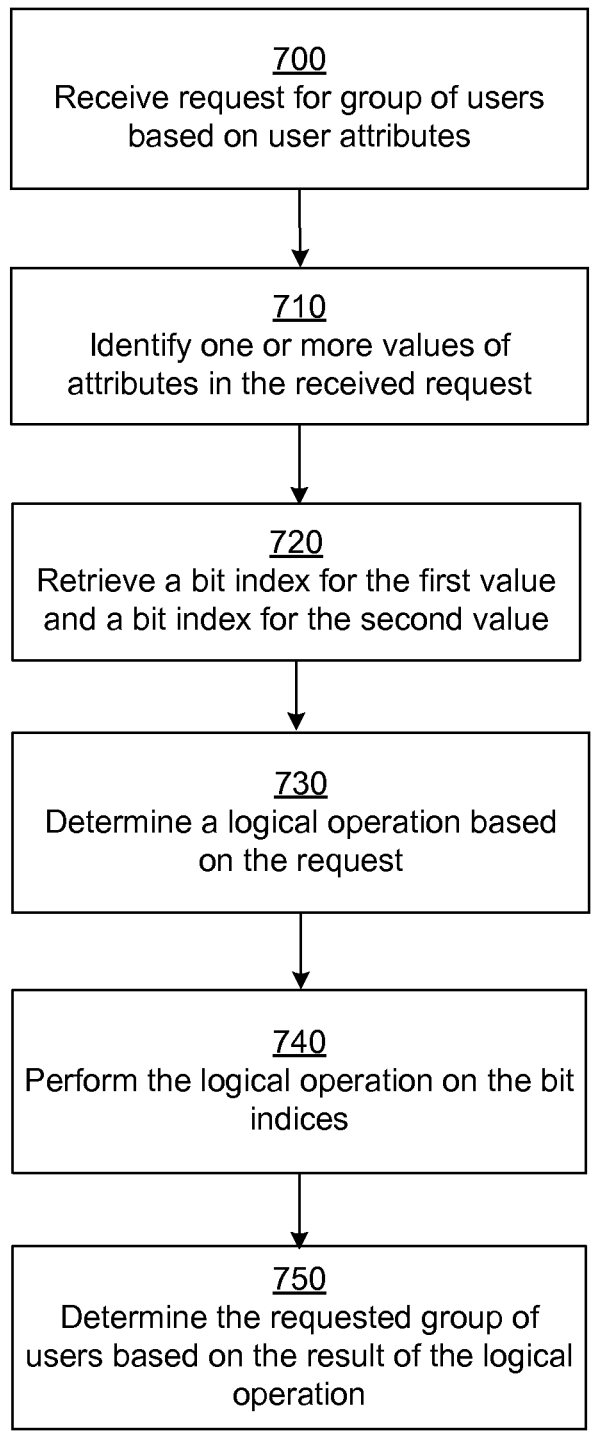
FIG. 7 is a flowchart of an overall process executed by the online system for determining groups of users based on user attributes, in accordance with one embodiment of the invention.

FIG. 7 is a flowchart of the overall process executed by the online system for determining groups of users based on user attributes, in accordance with one embodiment of the invention. The request analyzer 345 receives 700 a request for determining a group of users based on user attributes. In an embodiment, the request may be generated by the population analyzer 110 as part of a request for analysis of a subset of a population received by the online system 100 from the population analysis user interface 325. In other embodiments, the request may be received from an external system, for example, through a web services interface.

The request analyzer 345 analyzes the received request to determine the type of group of user to be determined. In an embodiment, the request analyzer 345 parses the received request to identify various parameters of the request. The request may include one or more values of attributes. The values of the attributes may be for distinct attributes or for the same attribute. The request analyzer 345 identifies 710 the one or more values from the request. For example, the request may specify two values v1 and v2. The request analyzer 345 also determines the attributes associated with the attribute values.

The logical operation module 355 retrieves a bit index from the inverted index store 375 corresponding to each of the attribute values received in the request. For example, if the request specifies a first value of a first attribute and a second value of a second attribute, the logical operation module 355 retrieves a bit index for the first value of the first attribute and a second bit index for the second value of the second attribute. In a parallel architecture, the inverted index store 375 may store only a portion of the bit index corresponding to the subset of users associated with a particular node of the parallel architecture that is executing this step.

The logical operation module 355 determines 730 a type of logical operation to be performed using the bit index values. The logical operation module 355 determines 730 the type of logical operation based on the request. For example, if the request specifies computation of a group of users having a first value and a second value of the same attribute, the logical operation module 355 determines the type of logical operation to be performed to be a bit-and operation. If the request specifies computation of a group of users having either a first value or a second value of the same attribute, the logical operation module 355 determines the type of logical operation to be performed to be a bit-or operation. The details of various types of logical operations performed for different types of requests are further described herein.

The logical operation module 355 performs 740 the identified bit operation on the retrieved bit indexes. In an embodiment, where the process of FIG. 7 is performed using a parallel architecture, the identified bit operation is performed for various sets of users in parallel on different nodes of the parallel architecture. The logical operation module 355 determines 750 the requested group of users based on the result of the bit operation. For example, if a 1 value of the bit indicates the corresponding user has the attribute value corresponding to the bit index, the user is included in the group of users. In other words, all users having the bit value one as the result are included in the group.

Although FIG. 7 describes the process using bit-indexes, the process is applicable to any other representation of sets of users, for example, an enumeration of users. The enumeration of users may be represented as a linked list, as a tree structure or any other data structure that allows representation of a number of values.

Logical Operations Based on Inverted Indexes

The logical operation module 355 determines 730 the type of logical operation based on the type of criteria specified in the request. For example, if the logical operation module 355 receives a request to determine a group of users having one of a first value (say X) or a second value (Y), the logical operation module 355 identifies the logical operation to be a logical-or operation. In this embodiment, the criterion specified in the request identifies a single attribute of users but provides two or more values. For example the request may specify determining group of users that have state attribute as either California or Nevada. The request may specify multiple values of the attribute, for example, a group of users that have state attribute as one of California, Nevada, Alaska, or Oregon. If the request specifies determining group of users for whom the attribute can take any of a plurality of values, the logical operation module 355 identifies the logical operation to be the logical-or operation based on all the values specified in the plurality of values.

The logical operation module 355 determines 730 the type of logical operation to be a logical-and operation if the request specifies determining all users having a first value for a first attribute and a second value for a second attribute. For example, the logical operation module 355 may receive a request to determine all users having a particular value of the gender attribute and also a particular value of a country attribute.

The logical operation module 355 may receive a request to determine a group of users having one of a set of values for a first attribute and one of another set of values of a second attribute. In this situation, the logical operation module 355 determines a logical-and of two or more sub-expressions, each sub-expression representing a logical-or operation. For example, the logical operation module 355 may receive a request to determine users that belong to a particular range of age values and also belong to at least one of a set of countries. For this example, the logical operation module 355 determines a first sub-expression that performs a logical-or of sets of users for each age value. The logical operation module 355 also determines a second sub-expression that performs a logical-or of sets of users for each country value. The logical operation module 355 finally determines an expression combining the first and second sub-expression using a logical-and operation.

Figure 8:
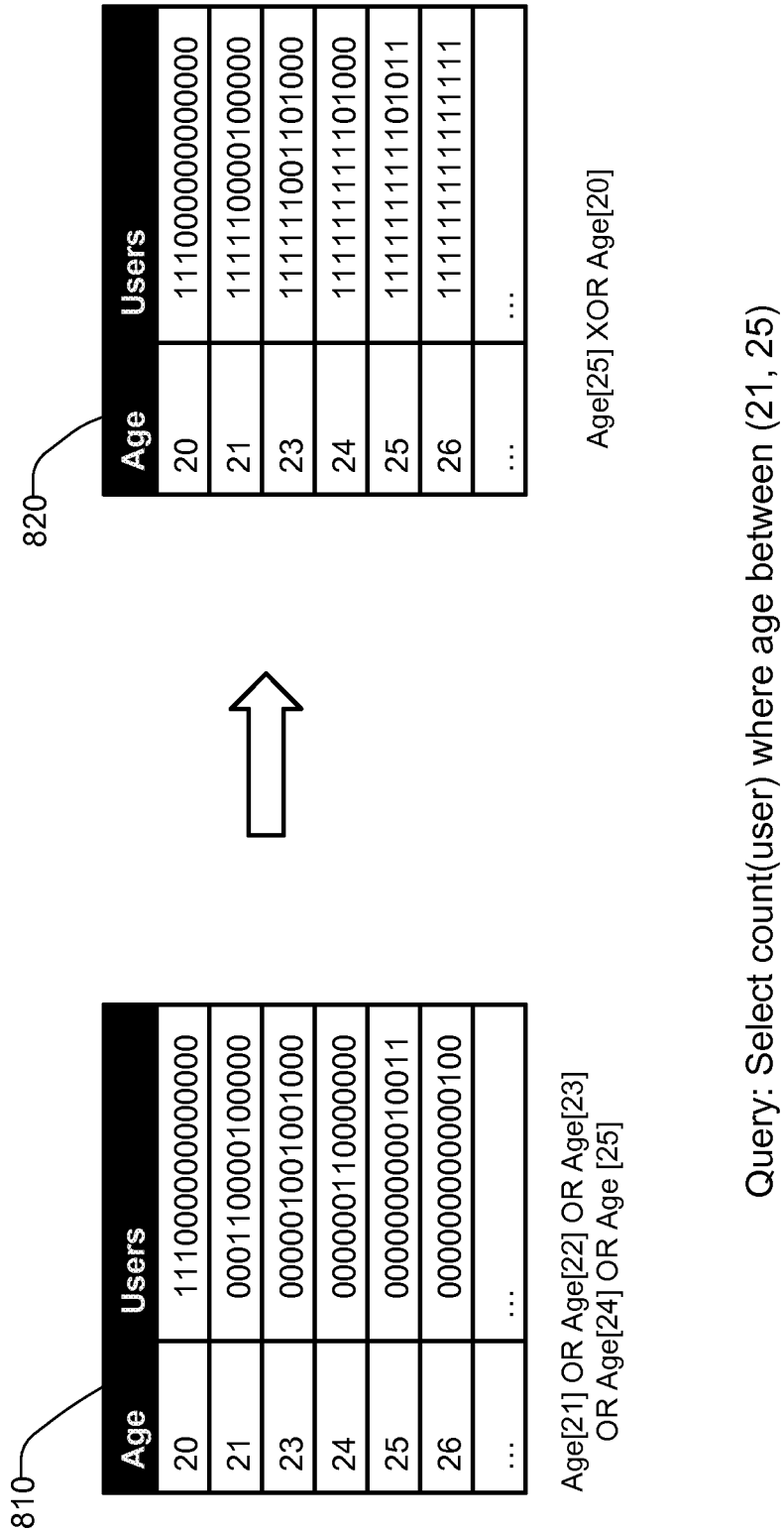
FIG. 8 illustrates a process for performing an xor operation to determine a set of users having an attribute value within a given range, according to an embodiment.

FIG. 8 illustrates how to perform an xor operation to determine a set of users having an attribute value within a given range, according to an embodiment. The inverted index store 375 identifies an attribute for which range queries are frequently received, for example, age attribute. The cumulative bit index module 380 determines and stores a cumulative bit index 820 based on the inverted index 810. The system stores either a cumulative bit index 820 or an inverted index for an attribute, not both. If the number of possible values of an attribute is small (say below a threshold value), the system stores a cumulative bit index for representing the attribute. However, if the number of possible values for the attribute is large (say above a threshold value), the system stores an inverted index for the attribute.

If the logical operation module 355 receives a request for all users for which a given attribute takes a value within a range between a first value and a second value, the logical operation module 355 performs a logical-xor operation to determine the requested group of users. The logical operation module 355 determines the group of users by performing a logical-xor operation of the cumulative bit index of the second value with the cumulative bit index of the value preceding the first value in the sequence. For example, assume that the logical operation module 355 receives a request for all users within a range X1 and X2, where X1 is the $i1^{th}$ element in the sequence of values for the attribute and X2 represents the $i2^{th}$ element in the sequence of values. The logical operation module 355 determines the group of users requested by performing a logical-xor operation between the cumulative bit index for value X2 and cumulative bit index for value X0 that represents $i0^{th}$ element of the sequence, such that i1 is i0+1.

For a given parallel or distributed architecture any of the logical operations discussed above, for example, logical-or, logical-and, logical-xor, and so on can be performed in parallel for distinct sets of users. For example, for the parallel architecture shown in FIG. 4, each leaf node 620 can perform the logical operation using an inverted index of elements assigned to the leaf node 620. The results of the logical operation may be propagated to an aggregator node 610.

Characteristics of Groups of Users

In an embodiment, the population characteristics module 370 determines certain statistical information describing a characteristic of users satisfying the criteria. The statistical information may be based on an attribute of the users of the set that is not specified in the criteria. For example, the statistical information may describe interactions of users from a group with an entity, for example, a web page, a social group, an event, or any entity represented in the online system 100. The statistical information may describe any characteristic of the users from a group, for example, a frequency of a type of activity of the users, usage of a type of device by the users, or a rate of spending of the users.

The statistical information may represent likes or dislikes of the users of a group towards an entity. For example, the number of likes of users from the group represents an aggregate measure of affinity of the users from the set with the entity. In some embodiments, the population characteristics module 370 may determine any other measure of affinity of users of a group towards an entity, for example, a web page.

The online system 100 or a business may use the statistical information determined by the population characteristics module 370 for selecting content for sending to the group of users. For example, a business may determine what type of advertisements to send to the group of users. Alternatively, the group of users may represent the target audience of the business and the business may use the statistical information for defining an advertisement creative or for determining the type of in-store experience provided by the business.

In an embodiment, the population characteristics module 370 compares the statistical information representing the group of users with the corresponding statistical information of another group of users, for example, the entire population of the users of the online system 100. For example, the population characteristics module 370 compares an aggregate value representing the number of likes for a page by the group of the users with the number of likes for the page by the entire population of the online system 100. This allows a business to determine how a group of people differs from the general population of users of the online system.

In an embodiment, an aggregate value of a requested characteristic of the determined set of users is computed in parallel by each leaf node 620 and an intermediate result representing the aggregate value determined by each leaf node is propagated to the aggregator node 610. The aggregator node 610 aggregates the intermediate results obtained from each leaf node 620 to determine an overall aggregate value.

Embodiments can be used to determine subsets of people belonging to any population. The population does not have to include users of an online system. The population may comprise information of people obtained from any external source, for example, by importing from an external system or manually entered. Furthermore, the online system 100 may be replaced by any computing system that may perform the processing. The computing system may also perform the processing in an offline mode. Furthermore, embodiments can be used to determine subsets of any type of entity that can be represented in the online system 100 and is not limited to people. For example, the processes disclosed herein can be used to determine groups of entities such as organizations, images, groups, web pages, and so on represented in the online system 100.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    storing information describing a population comprising a plurality of users of an online system, the information comprising a plurality of user attributes, each attribute associated with one or more values;
    for each of the plurality of user attributes, associating each value of the user attribute with a bit index, wherein each bit of the bit index represents a user and indicates whether the user attribute of the user matches the value of the user attribute;
    representing a plurality of values of a first user attribute as a sequence, the sequence comprising a starting value followed by one or more subsequent values;
    for each of the plurality of represented values, determining cumulative bit indexes, the determining comprising:
        determining a cumulative bit index for the starting value as the bit index of the starting value, and
        for each subsequent value in the sequence, determining a cumulative bit index by performing a logical or operation on the bit index of the subsequent value with the cumulative bit index of the previous value in the sequence;
    receiving, by the online system from a user interface of a client device, a request to determine a subset of the population comprising a set of users who satisfy a criterion based on a first value of the first attribute and a second value of the first attribute;
    retrieving a first cumulative bit index corresponding to the first value and a second cumulative bit index corresponding to the second value;
    identifying a logical operation based on the criterion specified in the request;
    performing the identified logical operation using the first cumulative bit index and the second cumulative bit index;
    determining the subset of the population comprising the set of users satisfying the criterion based on the result of the logical operation; and
    sending to the client device for display via the user interface, information describing the subset of the population.

2. The computer implemented method of claim 1, wherein identifying the logical operation comprises:
    determining that the first attribute is same as the second attribute and the request is for all users having one of: the first value or the second value for the first attribute; and
    responsive to the determination, identifying the logical operation to be a logical-or operation.

3. The computer implemented method of claim 1, wherein identifying the bit operation comprises:
    identifying the logical operation to be a logical-and operation responsive to the request being for all users having the first value for the first attribute and the second value for the second attribute.

4. The computer implemented method of claim 1, further comprising:
    representing a plurality of values of the first attribute as a sequence, the sequence comprising a starting value followed by subsequent values; and
    for each of the plurality of values, determining cumulative bit indexes, the determining comprising:
        determining a cumulative bit index for the starting value as the bit index of the starting value; and
        for each subsequent value in the sequence, determining a cumulative bit index by performing a bit-or operation on the bit index of the subsequent value with the cumulative bit index of the previous value in the sequence.

5. The computer implemented method of claim 4, further comprising:
    determining that the first attribute is same as the second attribute and the request is for all users having the first attribute in a range between the first value and the second value; and
    performing a logical-xor operation of the cumulative bit index of the second value with the cumulative bit index of the value preceding the first value in the sequence responsive to the request being for all users having the first attribute in the range between the first value and the second value.

6. The computer implemented method of claim 1, wherein the stored information describing the plurality of users comprises a third attribute, the method further comprising:
determining whether to represent sets of users associated with values of the third attribute as one of: enumeration of users or a bit index based on the number of distinct values of the third attribute.

7. The computer implemented method of claim 6, further comprising:
responsive to determining that the number of distinct values of the third attribute exceed a threshold value, associating each value of the third attribute with an enumeration of users for whom the third attribute matches the value.

8. The computer implemented method of claim 6, wherein the criterion specifies a third value of the third attribute, the method further comprising:
converting the enumeration of users associated with the third value to a bit index representation for performing the logical operation based on the bit index.

9. The computer implemented method of claim 1, wherein an attribute of a user represents information describing the user stored in a user profile of the user.

10. The computer implemented method of claim 1, wherein an attribute of a user represents information describing other users connected to the user in a social networking system.

11. The computer implemented method of claim 10, wherein the attribute of the user represents an aggregate value based on user profile information of the other users connected to the user in the social networking system.

12. The computer implemented method of claim 1, further comprising:
determining statistical information describing a characteristic of users from the determined set of users; and
selecting content for sending to the set of users based on the statistical information.

13. The computer implemented method of claim 12, wherein the statistical information is determined using a distributed system comprising a plurality of leaf nodes and an aggregator node, each leaf node assigned to a subset of users, the determining of statistical information further comprising:
determining, by a leaf node, an intermediate result representing an aggregate value based on the characteristic of the subset of users assigned to the leaf node;
propagating, by the leaf node, the intermediate result to the aggregator node; and
determining, by the aggregator node, an overall aggregate value based on the intermediate results received by the aggregator node from the leaf nodes.

14. The computer implemented method of claim 12, wherein the statistical information describes interactions of the users from the determined set with a web page.

15. The computer implemented method of claim 12, wherein the statistical information describes one of: a frequency of a type of activity by users, usage of a type of device by the users, or a rate of spending of users.

16. The computer implemented method of claim 12, wherein the selected content comprises an advertisement for presentation to one or more users of the set.

17. The computer implemented method of claim 1, wherein the set of users is a first set of users, the method further comprising:
identifying a characteristic of the first set of users satisfying the criterion; and
comparing the identified characteristic of the first set of users with the identified characteristics of a second set of users.

18. The computer implemented method of claim 1, wherein a bit index is distributed across a plurality of electronic processors, each electronic processor storing information describing a subset of users such that the logical operation is performed in parallel by each of the plurality of processors using a portion of the first bit index assigned to the processor and a portion of the second bit index assigned to the processor.

19. A non-transitory computer readable storage medium storing instructions for:
storing information describing a population comprising a plurality of users of an online system, the information comprising a plurality of user attributes, each attribute associated with one or more values;
for each of the plurality of user attributes, associating each value of the user attribute with a bit index, wherein each bit of the bit index represents a user and indicates whether the user attribute of the user matches the value of the user attribute;
representing a plurality of values of a first user attribute as a sequence, the sequence comprising a starting value followed by one or more subsequent values;
for each of the plurality of represented values, determining cumulative bit indexes, the determining comprising:
determining a cumulative bit index for the starting value as the bit index of the starting value, and
for each subsequent value in the sequence, determining a cumulative bit index by performing a logical or operation on the bit index of the subsequent value with the cumulative bit index of the previous value in the sequence;
receiving, by the online system from a user interface of a client device, a request to determine a subset of the population comprising a set of users who satisfy a criterion based on a first value of the first attribute and a second value of the first attribute;
retrieving a first cumulative bit index corresponding to the first value and a second cumulative bit index corresponding to the second value;
identifying a logical operation based on the criterion specified in the request;
performing the identified logical operation using the first cumulative bit index and the second cumulative bit index;
determining the subset of the population comprising the set of users satisfying the criterion based on the result of the logical operation; and
sending to the client device for display via the user interface, information describing the subset of the population.

20. A computer-implemented system comprising:
a computer processor; and
a non-transitory computer readable storage medium storing instructions for:
storing information describing a population comprising a plurality of users of an online system, the information comprising a plurality of user attributes for each user, each attribute associated with one or more values;
for each of the plurality of user attributes, associating each value of the user attribute with a bit index, wherein each bit of the bit index represents a user and indicates whether the user attribute of the user matches the value of the user attribute;

representing a plurality of values of a first user attribute as a sequence, the sequence comprising a starting value followed by one or more subsequent values;

for each of the plurality of represented values, determining cumulative bit indexes, the determining comprising:

determining a cumulative bit index for the starting value as the bit index of the starting value, and for each subsequent value in the sequence, determining a cumulative bit index by performing a logical or operation on the bit index of the subsequent value with the cumulative bit index of the previous value in the sequence;

receiving, by the online system from a user interface of a client device, a request to determine a subset of the population comprising a set of users who satisfy a criterion based on a first value of the first attribute and a second value of the first attribute a second attribute of the plurality of attributes;

retrieving a first cumulative bit index corresponding to the first value and a second cumulative bit index corresponding to the second value;

identifying a logical operation based on the criterion specified in the request;

performing the identified logical operation using the first cumulative bit index and the second cumulative bit index; and determining the subset of the population comprising the set of users satisfying the criterion based on the result of the logical operation; and sending to the client device for display via the user interface, information describing the subset of the population.

21. The computer implemented method of claim 1, wherein the information describing the subset of population comprises an aggregated value based on user interactions performed with the online system by users of the subset of the population.

22. The computer implemented method of claim 1, wherein the information describing the subset of population comprises information describing pages liked by users belonging to the subset of population.

23. The computer implemented method of claim 1, wherein the information describing the subset of population comprises a list of top ranking pages liked by users belonging to the subset of population.

* * * * *